United States Patent
Mariani et al.

(10) Patent No.: US 8,985,167 B2
(45) Date of Patent: Mar. 24, 2015

(54) TYRE FOR MOTORCYCLES

(75) Inventors: Mario Mariani, Milan (IT); Luca Bruschelli, Milan (IT); Silvio Montanari, Milan (IT); Francesco Gagliardi, Milan (IT); Misani Pierangelo, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 0 days.

(21) Appl. No.: 14/237,721

(22) PCT Filed: Aug. 8, 2012

(86) PCT No.: PCT/IB2012/001535
§ 371 (c)(1),
(2), (4) Date: Feb. 7, 2014

(87) PCT Pub. No.: WO2013/021271
PCT Pub. Date: Feb. 14, 2013

(65) Prior Publication Data
US 2014/0182757 A1    Jul. 3, 2014

Related U.S. Application Data

(60) Provisional application No. 61/557,629, filed on Nov. 9, 2011.

(30) Foreign Application Priority Data

Aug. 9, 2011  (IT) .............................. RM2011A0432

(51) Int. Cl.
*B60C 11/117* (2006.01)
*B60C 11/03* (2006.01)
*B60C 11/04* (2006.01)

(52) U.S. Cl.
CPC ........... *B60C 11/033* (2013.04); *B60C 11/0302* (2013.04); *B60C 11/0311* (2013.04);
(Continued)

(58) Field of Classification Search
CPC  B60C 11/03; B60C 11/0302; B60C 11/0304; B60C 11/032; B60C 2200/10; B60C 2200/12; B60C 2200/14; B60C 2011/0358; B60C 2011/0372; B60C 2011/0374; B60C 2011/0381; B60C 2011/0383; B60C 11/13
USPC ............... 152/209.28, 209.11, 209.18, 209.8, 152/903, 904, 209.1, 209.16, 209.17; D12/535, 570
See application file for complete search history.

(56) References Cited

U.S. PATENT DOCUMENTS 3,833,040 A * 9/1974 Bins ........................... 152/154.2
D301,441 S * 6/1989 Matsumura ................... D12/535
(Continued)

FOREIGN PATENT DOCUMENTS

JP          63-116907      5/1988
WO    WO 2010/073279    * 7/2010
(Continued)

OTHER PUBLICATIONS

International Search Report from the European Patent Office for International Application No. PCT/IB2012/001535, mailing date Nov. 20, 2012.
(Continued)

*Primary Examiner* — Eric Hug
(74) *Attorney, Agent, or Firm* — Finnegan, Henderson, Farabow, Garrett & Dunner, L.L.P.

(57) ABSTRACT

A tire for motorcycles, having a tread band includes a central annular portion, two lateral annular portions and two shoulder annular portions. The axial extension of these portions is not greater than 25%, 35%, and 20% of the axial development of the tread band, respectively. The tread band includes a module repeated along the circumference of the tire in which at least two substantially longitudinal grooves, mainly extending in the lateral annular portions, include, moving axially away from the equatorial plane of the tire, at least three substantially straight and substantially consecutive segments, wherein the first segment forms an angle with respect to the equatorial plane greater than 150°; and the second segment has a length measured along its extension smaller than the length of the first segment.

21 Claims, 5 Drawing Sheets

(52) U.S. Cl.
CPC ............. *B60C11/04* (2013.01); *B60C 11/0304* (2013.04); *B60C 2200/10* (2013.04); *B60C 2011/0374* (2013.04); *Y10S 152/904* (2013.01)
USPC ............ 152/209.11; 152/209.18; 152/209.28; 152/904

(56) References Cited

U.S. PATENT DOCUMENTS

| | | | | |
|---|---|---|---|---|
| D612,796 S | * | 3/2010 | Kajimoto et al. | D12/535 |
| 2010/0282390 A1 | * | 11/2010 | Mariani et al. | 152/454 |
| 2012/0118456 A1 | | 5/2012 | Schiavolin et al. | |

FOREIGN PATENT DOCUMENTS

| | | | |
|---|---|---|---|
| WO | WO 2011/012979 | * | 2/2011 |
| WO | WO 2011/012980 | | 2/2011 |

OTHER PUBLICATIONS

Written Opinion of the International Searching Authority from the European Patent Office for International Application No. PCT/IB2012/001535, mailing date Nov. 20, 2012.

* cited by examiner

TYRE FOR MOTORCYCLES

CROSS REFERENCE TO RELATED APPLICATIONS

This application is a national phase application based on PCT/IB2012/001535, filed Aug. 8, 2012, which claims the priority of Italian Patent Application No. RM2011A000432, filed Aug. 9, 2011, and the benefit of U.S. Provisional Application No. 61/557,629, filed Nov. 9, 2011, the content of each application being incorporated herein by reference.

FIELD OF THE INVENTION

The present invention relates to tyres for motorcycles. In particular, the present invention relates to tyres intended to be mounted on the wheel of "supersport" motorcycles having large engine capacity (e.g. 600 $cm^3$ or higher), and/or high power (e.g. 130-140 hp or higher), also used on tracks.

PRIOR ART

FIG. 1 shows the lateral development of a tread portion of a known tyre of the Applicant, marketed under the trademark Diablo Supercorsa™, adapted mainly for sport use, on motorcycles having large engine capacity. In particular, FIG. 1 shows the tread pattern of a Diablo Supercorsa™ tyre, adapted to be mounted on a rear wheel of a motorcycle.

Referring to FIG. 1, the tread has a tread pattern comprising a plurality of grooves altogether defining on said tread band a void-to-rubber ratio between 4% and 10%.

In particular, the tread band comprises a plurality of first substantially longitudinal grooves 118; 119 oppositely inclined with respect to the equatorial plane X-X of the tyre and a plurality of second substantially longitudinal grooves 115; 116 oppositely inclined with respect to the equatorial plane X-X of the tyre. Each first longitudinal groove 118; 119 is alternated with a second longitudinal groove 115; 116.

Each first groove has (moving axially away from the equatorial plane) two straight, circumferentially consecutive segments, wherein the first segment 120 has an inclination with respect to the equatorial plane adapted to form an angle greater than 90° and the second segment 121 has an inclination with respect to the equatorial plane adapted to form an angle smaller than 90°, preferably between 30° and 60°, in the different sizes of the front e rear tyres.

Furthermore, the second segment 121 extends in a radial region of the tread band defined by radial angles between +/−15° and +/−30°, in the different sizes of the front e rear tyres.

The pattern shown in FIG. 1 is formed on the tread of a tyre with radial carcass, on which a belt structure comprising at least one layer of cords arranged substantially along a circumferential direction is superimposed.

The Diablo Supercorsa™ tyre is very much appreciated by motorcyclists for its excellent features of drivability, grip, handling and stability also at high speeds. In particular, its tread pattern contributes to achieving a suitable contact surface in the different driving conditions (on straight paths and/or on bends), and ensures an adequate water draining when running out of a track on wet asphalt.

SUMMARY OF THE INVENTION

In recent times a trend has been observed to introduce in the market motor vehicles for supersport use having increasingly high power. For example, motor vehicles for road use having an engine capacity of 1000 $cm^3$, with powers of 180 hp, are in fact already available on the market.

The use of softer compounds, i.e. compounds able to better adapt to the profile defined by the bumps in the road surface and/or to penetrate such bumps, characterised by a lower modulus of elasticity and/or high hysteresis, in the tread band would allow the grip requirements of tyres adapted to be mounted on motorcycles of such high powers to be met. However, from tests carried out with the Diablo Supercorsa™ tyres described above, the Applicant has observed that the use of such compounds in these tyres could give rise to uneven wear phenomena in the shoulder region, with a triggering of such wear particularly at the second straight segments of the first grooves, resulting in a reduction of the behaviour stability.

For solving wear problems it is known to give the tyre grooves a particular course, substantially in the same direction as the local stress state, as taught for example discloses in JP63-116907.

The Applicant has observed that, generally, for solving wear problems of this kind, the grooves or groove segments not aligned with the course of the stresses in the tread band are eliminated.

The Applicant has thus faced the problem of providing tyres for motorcycles which can ensure, even when soft compounds are used, suitable features of behaviour stability and wear evenness substantially in any running condition of the motorcycle, particularly in critical conditions such as high accelerations/decelerations when leaving/entering a bend, and/or when running at high speed on a bend. The Applicant has found that this problem can be solved by using a tread pattern with grooves having a particular course and arrangement, particularly as far as the segments not aligned with the course of the stresses in the tread band are concerned.

In a first aspect thereof, the invention relates to a tyre for motorcycles, having a tread band comprising a central annular portion (A) symmetrically located astride an equatorial plane (X-X); two lateral annular portions (C) located on axially opposite sides with respect to the central annular portion (A); and two shoulder annular portions (B) located on axially opposite sides with respect to the lateral annular portions (C); the central annular portion (A) having an axial extension not greater than 25% of the axial development of the tread band; each shoulder annular portion (B) having an axial extension not greater than 20% of the axial development of the tread band;
each lateral annular portion (C) having an axial extension not greater than 35% of the axial development of the tread band; the tread band comprising a plurality of grooves adapted to define a tread pattern;
the grooves of the tread pattern altogether define a void-to-rubber ratio lower than 8% on said tread band; the tread band comprising a module repeated along a direction of circumferential development of the tyre, comprising:
  at least two substantially longitudinal grooves, oppositely inclined with respect to the equatorial plane X-X of the tyre; wherein:
  the first substantially longitudinal grooves mainly extend in the lateral annular portions (C) and comprise, moving axially away from the equatorial plane X-X of the tyre, at least three substantially straight and substantially consecutive segments wherein the first segment has an inclination with respect to the equatorial plane X-X adapted to form an angle α greater than 150°;
  the second segment has a length measured along its extension smaller than the length of the first segment;

the second segment (21) extending in a radial region of the lateral annular portion defined by radial angles φ between +/−5° and +/−25°, in the case of a tyre intended to be mounted on the rear wheel of a motorcycle, and between +/−5° and +/−20°, in the case of a tyre intended to be mounted on the front wheel of a motorcycle.

The Applicant has observed that such an arrangement and configuration of the first longitudinal grooves counteracts the triggering of uneven wear phenomena. The Applicant believes that such an improvement is due to a better interaction of the tread pattern with the local stress and strain state of the compound generally caused by use on high performance vehicles.

The Applicant has, in fact, found that the second segment of the first grooves, although not aligned with the stress distribution lines, and thus arranged and configured contrary to any common teaching of a man skilled in the art, does not, or in any case not significantly, trigger wear phenomena.

The Applicant believes that such a surprising effect is due to fact that in straight running the stress resultant acting on the tread band is directed substantially circumferentially, and the lateral stress component acting on the second segment of the first grooves is thus negligible.

Vice versa, when leaning, and particularly during high accelerations and decelerations when leaving and entering a bend, i.e. when the tread band is subjected to higher shear stress, the stress resultant acts on an axially outer portion of the tyre with respect to the location of the second segment of the first groove, which thus is not, or only marginally affected by such a stress resultant.

The Applicant has further observed that, although it is commonly believed that arranging consecutively two substantially straight groove segments, with the second segment counter-inclined with respect to the first one, could generate structural weakening points of the groove, such an arrangement produces an increased synergetic effect as regards the draining of the tread band.

In particular, the Applicant has found that by arranging a third straight segment consecutively to the second segment of the first grooves and by counter-inclining it with respect to said second segment, so as to preferably substantially align it with the stress course, the structural weakening of the groove is minimal, whereas the draining effect of the tread band is noticeably increased compared to the effect provided by grooves having substantially the same extension as the aforesaid segments, but separated from one another.

By the expression module of the tread pattern it is meant a tread band portion which is repeated the same in succession along the whole circumferential development of the tread band itself. The modules, while keeping the same pattern configuration, may however have different circumferential lengths.

By "tread pattern" it is meant the representation of each point of the tread band (grooves included) on a plane perpendicular to the equatorial plane of the tyre and tangent to the maximum diameter of the tyre.

By the expression "substantially straight segments" segments are meant which are arranged according to straight lines over at least 80% of their extension.

By the expression "substantially consecutive straight segments" two straight segments are meant which are arranged directly one after the other, but also two substantially straight segments connected with each other by a substantially curvilinear portion having an extension equal to or smaller than the minimum extension of the straight segments.

Angular measurements, and/or linear quantities (distances, widths, lengths, etc.), and/or areas are to be intended as referred to the tread patter as defined above.

Moreover, referring to the angular arrangement of the grooves formed in the tread band with respect to the equatorial plane of the tyre, such an angular arrangement is to be intended, for each point of the groove, as referred to the angle (between 0° and 180°) formed by a rotation made starting from the equatorial plane up to the direction tangent to the groove passing through that point.

In the case of a tyre adapted to be mounted on the rear wheel of a motorcycle, such as for example that shown in FIGS. 1 and 4, the rotation is meant to be performed by a vector initially lying along the direction defined, in the tread pattern, by the equatorial plane, and oriented opposite to the predetermined rotation direction of the tyre (indicated by arrow F in the figures).

The following definitions further apply:

By "tyre for motorcycles" it is meant a tyre having a high curvature ratio (typically higher than 0.200), which allows high camber angles (for example) 50°-60° to be reached when the motor vehicle runs on a bend.

By "radial angle" of the location of a groove or a of segment thereof, considering a straight section of the tyre, it is meant the angle between the equatorial plane of the tyre mounted on the motorcycle wheel, not resting on the ground, and a radial plane passing through the midline of the groove and through the centre of a circumference defined by three points: the intersection point between the equatorial plane X-X and the tyre profile; the points of the maximum chord on the tyre profile, identified by reference E in FIG. 1.

By "equatorial plane" of the tyre it is meant a plane perpendicular to the rotation axis of the tyre and dividing the tyre into two symmetrically equal portions.

By "circumferential" direction it is meant a direction generically directed according to the rotation direction of the tyre, or in any case only slightly inclined with respect to the rotation direction of the tyre.

By "void-to-rubber ratio" it is meant the ratio between the total area of the grooves of a determined portion of the tread pattern of the tyre (possibly of the whole tread pattern) and the total area of the same portion of the tread pattern (possibly of the whole tread pattern).

By "axial extension" L of a tread band portion it is meant the length of the arc defining the radially outermost profile of the tread band in a cross section of the tyre.

By "curvature ratio" of the tyre it is meant the ratio between the distance of the radially highest point of the tread band from the maximum chord of the tyre, and the same maximum chord of the tyre, in a cross section of the tyre.

By "average width" of a groove it is meant the ratio between the area and the length of the groove.

The present invention, in one or more preferred aspects, may comprise one or more of the features hereinafter presented.

The module may be repeated along a circumferential direction of the tyre at most 13 times. Preferably, at most 10 times.

In the Applicant's opinion, such a low repetition of the module contributes to making the grooves less frequent in the circumferential direction and counteracts the compound mobility, providing a stabilizing effect against perturbations arising while running on a road surface.

Preferably, the third straight segment is located consecutively to the second segment and may have an inclination with respect to the equatorial plane X-X adapted to form an angle γ between 90° and 180°.

For avoiding an excessive reduction of the number of grooves of the tread band, with a resulting decrease in safety when running on a wet ground, the grooves of the tread pattern conveniently define on the tread band a void-to-rubber ratio greater than 4%.

Preferably, therefore, the axially outermost point of the midline of the second segment 21 of the first grooves is located at radial angles of +/−25° at most.

Preferably, the first substantially straight segment of the first longitudinal grooves has a length measured along its extension greater than 4% of the circumferential development of the tyre.

The second substantially straight segment of the first longitudinal grooves may have an inclination with respect to the equatorial plane X-X adapted to form an angle β smaller than 60°.

Advantageously, the second substantially straight segment may have a length measured along its extension smaller than 40 mm.

Preferably, the first substantially straight segment may extend in a radial region of the lateral annular portion (C) defined by radial angles φ between +/−5° and +/−25°, in the case of a tyre intended to be mounted on the wheel tyre of a motorcycle, and between +/−5° and +/−20°, in the case of a tyre intended to be mounted on the front wheel of a motorcycle.

The third segment may extend in a radial region of the lateral annular portion (C) defined by radial angles φ between +/−5° and +/−50°, in the case of a tyre intended to be mounted on the rear wheel of a motorcycle, and between +/−5° and +/−55°, in the case of a tyre intended to be mounted on the front wheel of a motorcycle.

Preferably, the third segment has an extension greater than the extension of the second segment, but smaller than the extension of the first segment.

In each module, the two first substantially longitudinal grooves may be staggered with respect to each other in the circumferential direction.

Preferably, the second segment may have an inclination with respect to the equatorial plane X-X adapted to form an angle β between 15° and 60° extremes included.

Advantageously, the first segment may have an inclination with respect to the equatorial plane X-X adapted to form an angle α between 150° and 180° extremes included.

In order to provide a greater stiffness both in the circumferential direction and in the lateral direction, above all in a tyre, as the present one, intended also for sport use, the tread band may comprises only first grooves.

Each shoulder annular portion (B) may have a void-to-rubber ratio equal to zero.

Advantageously, the central annular portion (A) may have a void-to-rubber ratio lower than 2%.

Each lateral annular portion (C) may have a void-to-rubber ratio greater than 4%.

Preferably, the tread pattern defines on said tread band a void-to-rubber ratio which increases from the equatorial plane X-X towards the lateral annular portions (C) and decreases from the lateral annular portions (C) towards the shoulder portions (B).

The first substantially longitudinal grooves comprise at least one end having a gradual depth decrease.

Preferably, the first grooves comprise an end comprising two first outer edges substantially parallel to the extension direction of the first groove and a transverse outer edge inclined with respect to the extension direction of the groove; the outer edge may be joined to the two first outer edges.

Such a choice for the configuration and depth course of the end of the grooves contributes to lowering the probability of triggering wear phenomena which are typical of these regions. The Applicant believes that such a lowering is due to presence in such regions of fewer discontinuities created by the configuration and depth course of the groove.

Preferably, the first grooves may have an average width smaller than or equal to about 6 mm.

Conveniently, the first grooves may have a depth smaller than or equal to about 8 mm.

The Applicant has observed that the aforesaid choices as to the depth and width of the longitudinal grooves allow the behaviour stability of the tread band to be further improved, even when particularly soft compounds are used.

Conveniently, the transverse profile of said tread band may have a curvature ratio greater than or equal to 0.300. With tyres having these curvature values, the Applicant has observed a substantial improvement of the behaviour on bends, particularly in a tyre to be mounted on the rear wheel of the motorcycle, and more particularly when running on bends at high speed with the maximum camber angle permitted by the tyre-motorcycle unit, and/or in full acceleration when leaving a bend. The Applicant believes that this improvement results from an increase in the surface of the contact region between tyre and ground.

On the rear tyre, at least an axially outer portion of said shoulder regions may have a void-to-rubber ratio equal to zero. The Applicant has observed that such a choice allows a considerable improvement in the contact surface when running on bends on dry surfaces at the maximum radial angle (or in any case at very high camber angles), which results in higher roadholding, stability and acceleration power when the motorcycle leaves the bend. Furthermore, the Applicant has observed that such a choice does not represent a danger when running on wet grounds, since in this running condition there is a tendency to avoid reaching such high camber angles on a bend.

BRIEF DESCRIPTION OF THE FIGURES

Further features and advantages of the present invention will become more apparent from the following detailed description of some embodiments thereof, provided as non-limiting examples, made hereafter with reference to the accompanying drawings, wherein.

DETAILED DESCRIPTION OF EMBODIMENTS OF THE INVENTION

Figure 2:
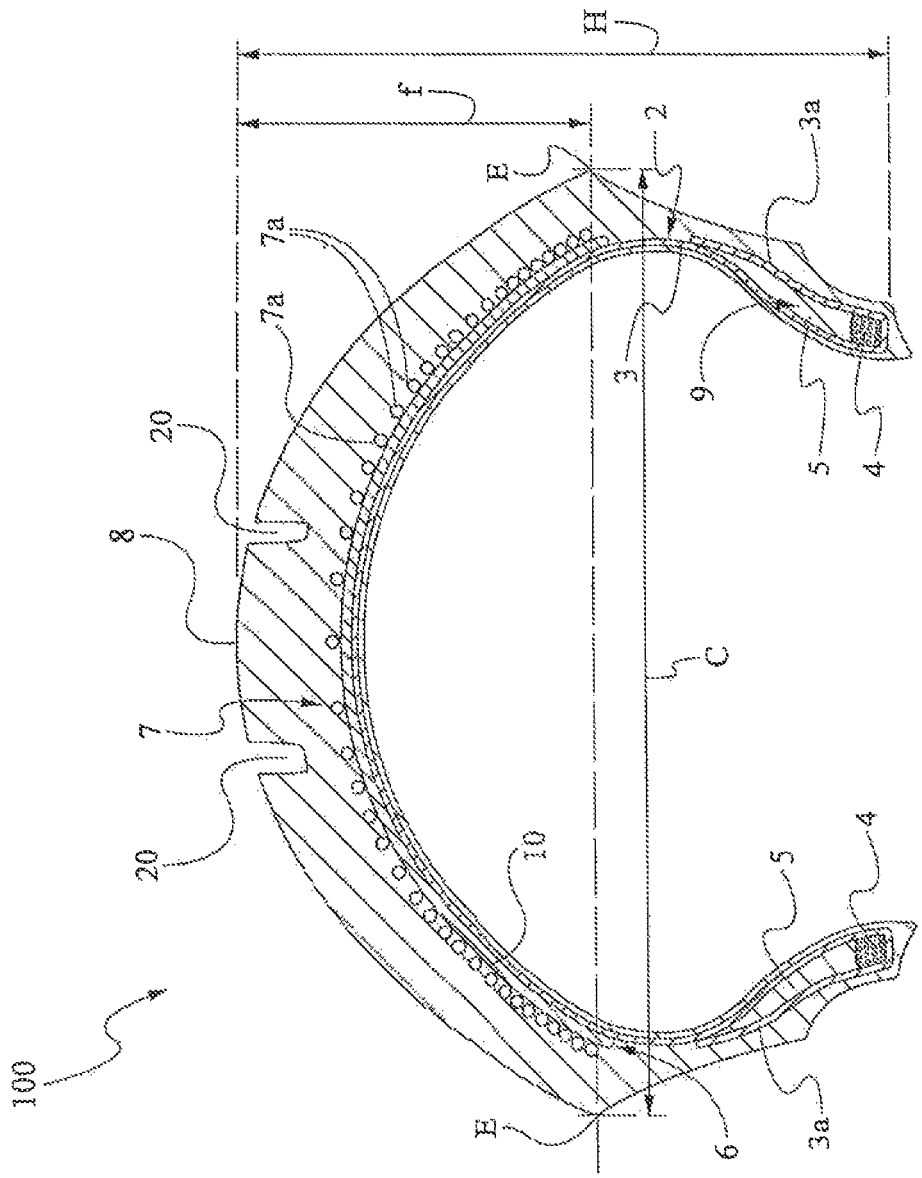
FIG. 2 schematically shows a radial section of a tyre for motorcycles.

In FIG. 2 a tyre for motorcycle wheels according to the present invention is generally indicated at 100. This is a tyre preferably intended to be used on the rear wheel of a motorcycle of the "Supersport" segment.

Figure 4:
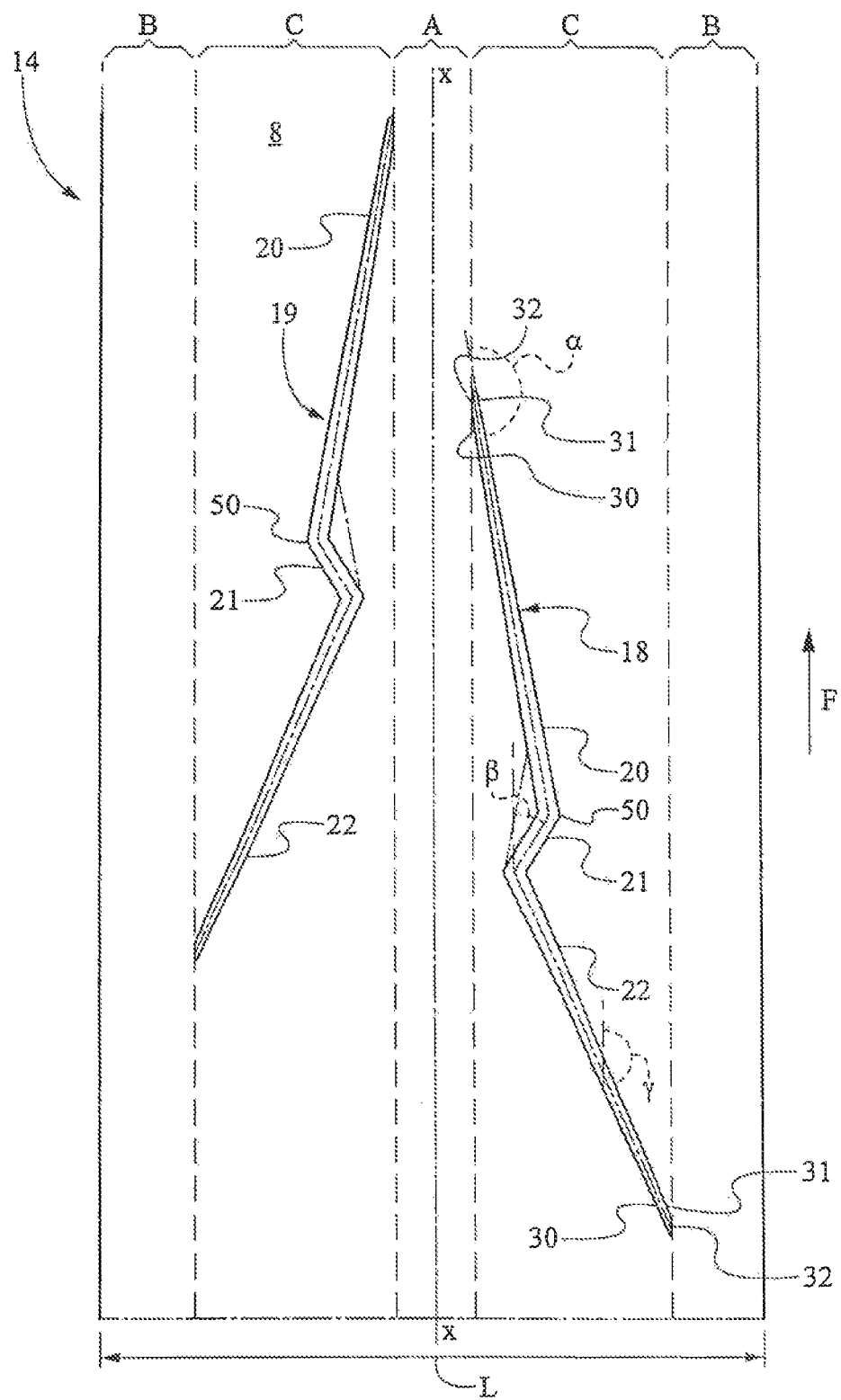
FIG. 4 shows a portion of the circumferential development of a first example of a tread pattern of a tyre according to the invention, particularly for a tyre to be mounted on the rear wheel of a motorcycle.

Referring to FIG. 4, an equatorial plane X-X and a rotation axis Z (not shown in the figures) are defined in the tyre 100. Moreover, there are defined a circumferential direction (indicated in the figures by arrow F pointing in the rotation direction of the tyre) and an axial direction, perpendicular to the equatorial plane X-X.

The tyre 100 comprises a carcass structure 2 including at least one carcass ply 3, made of an elastomeric material and comprising a plurality of reinforcing elements arranged parallel to one another.

The carcass ply 3 engages, by means of opposite circumferential edges thereof, at least one annular reinforcing structure 9.

In particular, the opposite lateral edges 3a of the carcass ply 3 are turned up about annular reinforcing structures called bead rings.

A tapered elastomeric filling 5 taking up the space defined between the carcass ply or plies 3 and the respective turned up lateral edge 3a of the carcass ply 3 is applied onto the axially outer perimeter edge of the bead rings 4.

As known, the tyre region comprising the bead ring 4 and the filling 5 forms the so-called bead, intended for anchoring the tyre to a respective fitting rim, not shown.

The reinforcing elements included in the carcass ply 3 preferably comprise textile cords, selected from those usually adopted in the manufacture of carcasses for tyres, for example nylon, rayon, PET, PEN cords, with an elementary thread having a diameter between 0.35 mm and 1.5 mm.

In an embodiment not shown, the carcass structure has its opposite lateral edges associated without a turn-up with special annular reinforcing structures provided with two annular inserts. A filling of elastomeric material may be located in an axially outer position with respect to the first annular insert. The second annular insert is instead located in an axially outer position with respect to the end of the carcass ply. Finally, in a axially outer position with respect to said second annular insert, and not necessarily in contact with the same, a further filling can be provided which terminates the formation of the annular reinforcing structure.

A belt structure 6 is circumferentially applied, in a radially outer position, onto the carcass structure 6. A tread band 8 is circumferentially superimposed on the belt structure 6. Longitudinal and/or transverse grooves, arranged so as to define a desired tread pattern, are typically formed on the tread band 8, further to a moulding operation carried out at the same time with the vulcanization of the tyre.

The tyre 100 may further comprise a pair of sidewalls laterally applied to the carcass structure 2 at axially opposite sides.

The tyre 100 has a straight section characterised by a high transverse curvature.

In particular, the tyre 100 has a height H of the section, measured at the equatorial plane, between the top of the tread band and the fitting diameter, defined by reference line r, passing through the tyre beads.

The tyre 100 further has a width C defined by the distance between the laterally opposite ends E of the tread itself, and a curvature defined by the specific value of the ratio between the distance f of the top of the tread from the line passing through the ends E of the tread itself, measured at the equatorial plane of the tyre, and the aforesaid width C. The ends E of the tread may be formed by a corner.

In the present description and in the subsequent claims, by high curvature tyres are meant tyres which have a curvature ratio f/C not lower than 0.2, preferably f/C≥0.25, for example equal to 0.28.

Preferably, the curvature ratio f/C is not greater than 0.8, preferably f/C≤0.5.

Figure 1:
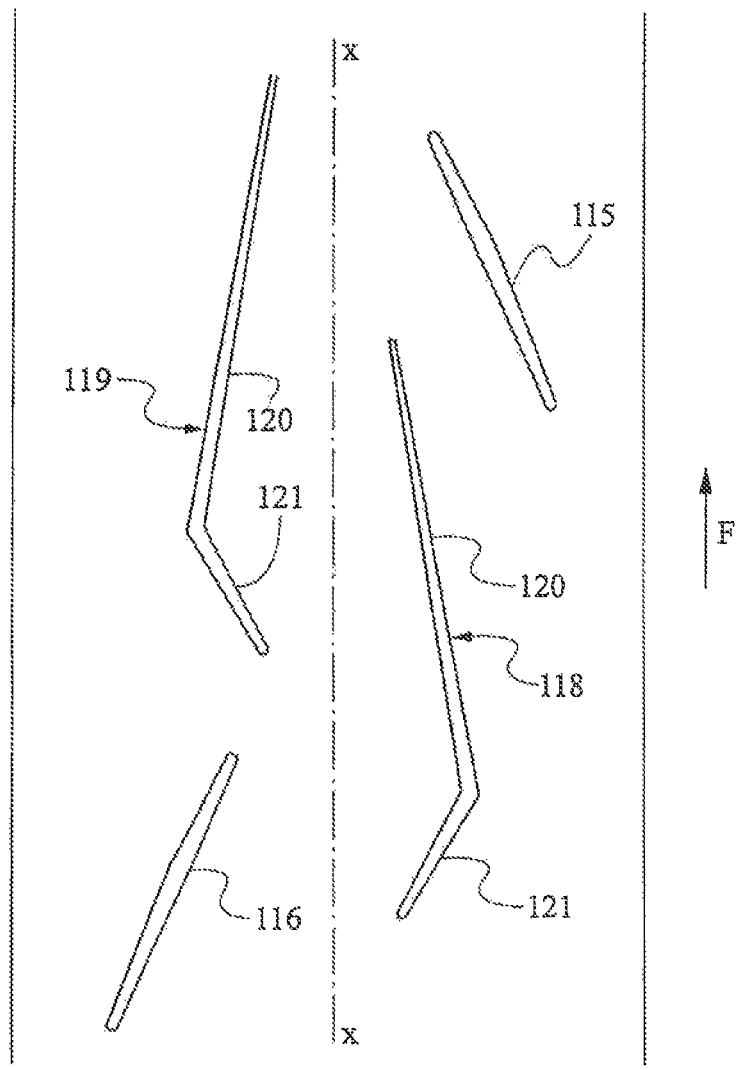
FIG. 1 shows a portion of the circumferential development of the tread band of a rear tyre known in the prior art.

Preferably, the tyres have particularly low sidewalls (FIG. 1). In other words, by tyres with low or lowered sidewalls tyres are meant in which the sidewall height ratio (H−f)/H is lower than 0.7, more preferably lower than 0.65, for example equal to 0.6.

The carcass structure 2 is preferably lined on its inner walls with a sealing layer, also called "liner", essentially consisting of a layer of an airproof elastomeric material, adapted to ensure the tight seal of the tyre itself after it has been inflated.

Preferably, the belt structure 6 consists of a layer 7 having a plurality of circumferential windings 7a axially arranged in side-by-side relationship, formed by a rubberized cord or by a strip comprising a number (preferably, from two to five) of rubberized cords, spirally wound at an angle substantially equal to zero (typically between 0° and 5°) with respect to the equatorial plane X-X of the tyre.

Preferably, the belt structure extends over the whole crown portion of the tyre.

In a preferred embodiment, the belt structure 6 may consist of at least two radially superimposed layers, each consisting of elastomeric material reinforced with cords arranged parallel to one another. The layers are arranged so that the cords of the first belt layer are oriented obliquely with respect to the equatorial plane of the tyre, whereas the cords of the second layer also have an oblique orientation, but symmetrically crossed with respect to the cords of the first layer (so-called "cross-belt").

In both cases, usually, the cords of the belt structure are textile or metal cords.

Preferably, the tyre 100 may comprise a layer 10 made of an elastomeric material, located between said carcass structure 2 and said belt structure 6 formed by said circumferential coils, said layer 10 preferably extending over a surface substantially corresponding to the surface on which the belt structure 6 develops. Alternatively, said layer 10 extends over a surface smaller than the surface on which the belt structure 6 develops, for example only over opposite lateral portions of the same.

In a further embodiment, an additional layer (not shown in FIG. 1) made of an elastomeric material is located between said belt structure 6 and said tread band 8, said layer preferably extending over a surface substantially corresponding to the surface on which said belt structure 6 develops. Alternatively, said layer extends only over at least a portion of the development of the belt structure 6, for example over opposite lateral portions of the same.

In a preferred embodiment, at least one of said layer and said additional layer comprises a reinforcing material, for example short aramid fibers, for example made of Kevlar®, dispersed in said elastomeric material.

The tread band 8 can be divided into a central annular portion A symmetrically located astride an equatorial plane X-X; two lateral annular portions C located on axially opposite sides with respect to the central annular portion A, and two shoulder annular portions B, located on axially opposite sides with respect to the lateral annular portions C.

Each central annular portion A has an axial extension not greater than 25% of the axial development L of the tread band 8 and preferably not smaller than 2% of the axial development L of the tread band 8.

Each shoulder annular portion B has an axial extension not greater than 20% of the axial development of the tread band 8 and preferably not smaller than 5% of the axial development L of the tread band 8.

Finally, each lateral annular portion C has an axial extension not greater than 35% of the axial development of the tread band 8.

Figure 3:
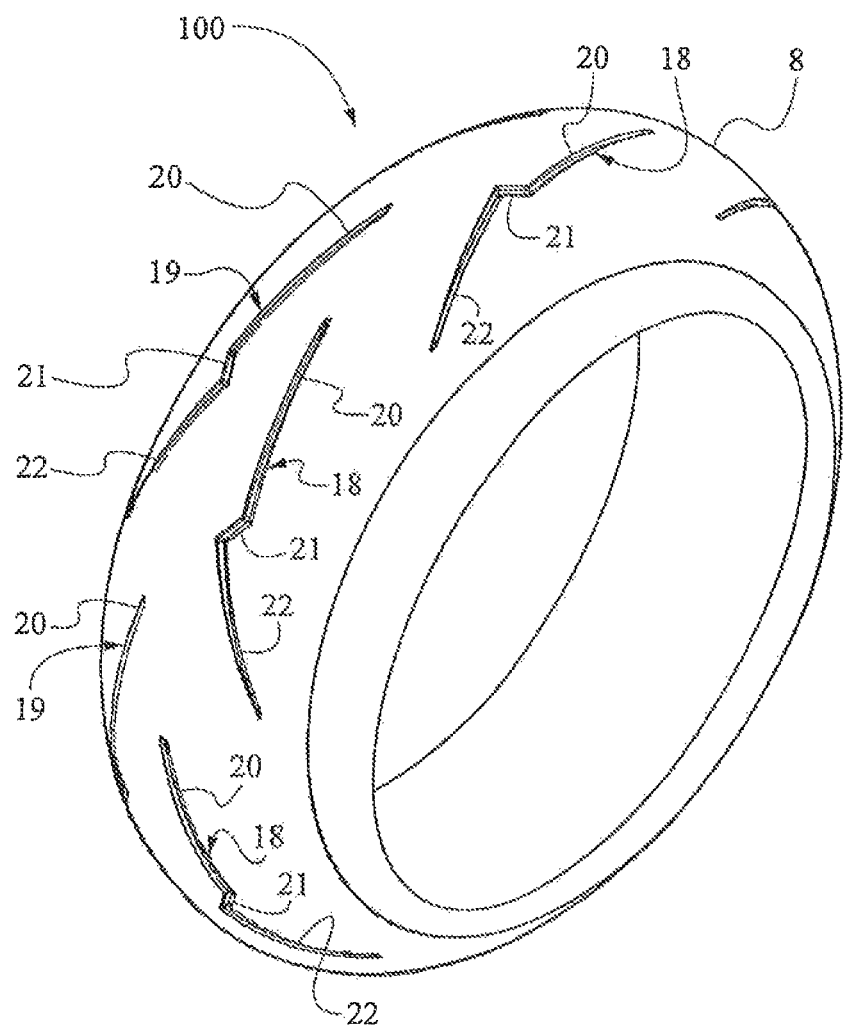
FIG. 3 shows a perspective view of a first example of a tyre according to the invention to be mounted on the rear wheel of a motorcycle.

As shown in FIG. 3, on the tread band 8 a tread pattern is formed comprising a plurality of grooves which altogether define on the tread band a void-to rubber-ratio greater than 4%.

According to an advantageous aspect of the present invention, the tread pattern comprises a module 14 repeated along a direction of circumferential development of the tyre. The module 14 is repeated along the circumferential development of the tyre at most 13 times. Preferably, at most 10 times, for example 7 times.

The module 14 has two substantially longitudinal grooves 18, 19, oppositely inclined with respect to the equatorial plane X-X of the tyre.

The first substantially longitudinal grooves 18, 19 mainly extend in the lateral annular portions C. In other words, each first grove 18 or 19 extends for at least 80% of its extension in one of the annular portions C.

Each first grove 18, 18 comprises, moving axially away from the equatorial plane X-X of the tyre, three substantially straight and consecutive segments 20, 21, 22.

In the case of a tyre intended to be mounted on the rear wheel of a motorcycle, such as that shown in FIGS. 2-5, the first segment 20 has an inclination with respect to the equatorial plane X-X adapted to form an angle $\alpha$ greater than 150°, preferably smaller than 180°, for example equal to about 160°.

The second segment 21 has instead an inclination with respect to the equatorial plane X-X adapted to form an angle $\beta$ smaller than 60°, preferably greater than 15°, for example equal to about 30°.

The third segment 22 has an inclination with respect to the equatorial plane X-X adapted to form an angle $\gamma$ greater than 90°, preferably smaller than 180°, for example equal to about 150°.

For providing very good draining features, preferably the first segment 20 of the first longitudinal grooves 18, 19, has a length measured along its extension greater than 4% of the circumferential development of the tyre. Preferably, smaller than 12% of the circumferential development of the tyre.

The second, substantially straight, segment 21 of the first longitudinal grooves 18, 19 has instead a length measured along its extension smaller than the length of the first segment 20.

Preferably, the second, substantially straight, segment of the first longitudinal grooves 18, 19 has a length measured along its extension smaller than 2% of the circumferential development of the tyre. Preferably, smaller than 1.5% of the circumferential development of the tyre.

Preferably, the second, substantially straight, segment 21 has a length measured along its extension smaller than 40 mm, even more preferably smaller than 30 mm.

In the embodiment shown in FIG. 4, the third, substantially straight, segment 22 has an extension greater than the extension of the second segment 21, but smaller than the extension of the first segment 20.

Such a choice for the configuration of the third segment 22 allows the draining features of the tread pattern to be improved without noticeably affecting the wear resistance features.

Still referring to the embodiment shown in FIGS. 3 and 4, the first segment 20 extends in a radial region of the lateral annular portion C defined by radial angles $\phi$ between +/−5° and +/−25°, in the case of a tyre intended to be mounted on the rear wheel of a motorcycle, and between +/−5° and +7-20°, in the case of a tyre intended to be mounted on the front wheel of a motorcycle.

Figure 5A:
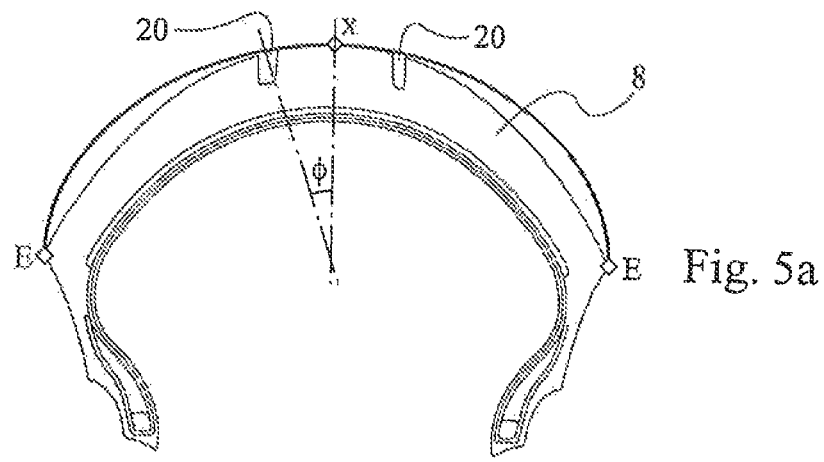
FIGS. 5*a*, 5*b*, 5*c* show schematic radial sections of the tyre according to the present invention, in each section the location of a point of a segment of a first groove being identified by its radial angle.

Referring to FIGS. 4 and 5a, the first segments 20 of the first longitudinal grooves 18 lying on the right of the equatorial plane X-X extend in a radial region of the lateral annular portion C defined by radial angles between +5° and +25°, whereas the first segments 20 of the first longitudinal grooves 19 lying on the left of equatorial plane X-X extend in a radial region of the lateral annular portion C defined by radial angles between −5° and −25°.

Figure 5B:
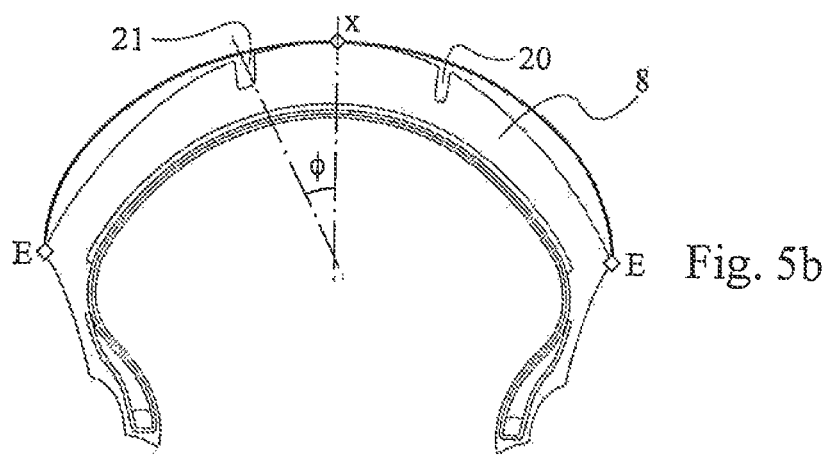
Figure 5C:
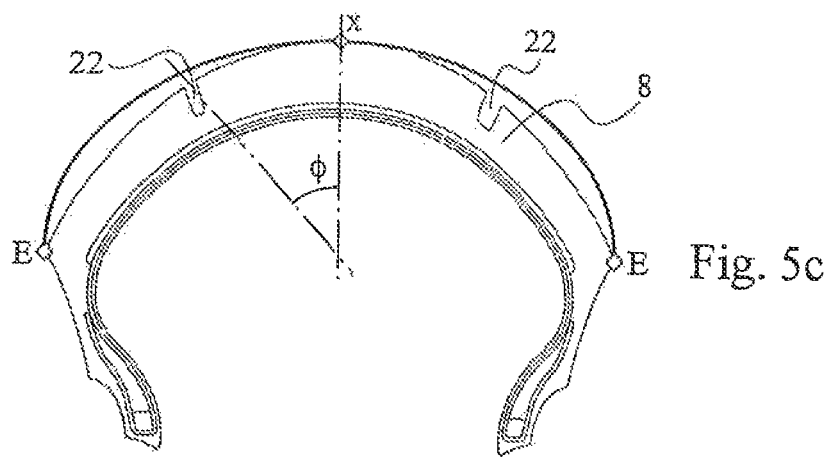

The second segment 21 extends in a radial region of the lateral annular portion C defined by radial angles $\phi$ between +/−5° and +/−25°, in the case of a tyre intended to be mounted on the rear wheel of a motorcycle, and between +/−5° and +/−20°, in the case of a tyre intended to be mounted on the front wheel of a motorcycle. Referring also in this case to FIGS. 4 and 5b, i.e. considering tyres intended to be mounted on the rear wheel of a motorcycle, the second segments 21 of the first longitudinal 18 lying on the right of the equatorial plane X-X extend in a radial region of the lateral annular portion C defined by radial angles between +5° and +25°, whereas the second segments 21 of the first longitudinal grooves 19 lying on the left of equatorial plane X-X extend in a radial region of the lateral annular portion C defined by radial angles between −5° and −25°.

Preferably, thus, the axially outermost point 50 of the midline of the second segment 21 of the first grooves 18, 19 is located at radial angles of +/−25° at most.

Finally, the third segment 22 extends in a radial region of the lateral annular portion C defined by radial angles $\phi$ between +/−5° and +/−50°, in the case of a tyre intended to be mounted on the rear wheel of a motorcycle, and between +/−5° and +/−55°, in the case of a tyre intended to be mounted on the front wheel of a motorcycle. Referring to FIGS. 4 and 5a, i.e. considering tyres intended to be mounted on the rear wheel of a motorcycle, the said third segments 22 of the first longitudinal grooves 18 laying on the right of the equatorial plane X-X extend in a radial region of the lateral annular portion C defined by radial angles between +5° and +50°, whereas the second segments 22 of the first longitudinal grooves 19 lying on the left of equatorial plane X-X extend in a radial region of the lateral annular portion C defined by radial angles between −5° and −50°.

The aforesaid angular ranges, defined with reference to the extension and location of the first 20, second 21 and third 22 segments of the first grooves 18, 19 can be applied both to tyres intended to be mounted on the front wheel and to tyres intended to be mounted on the rear tyre of a motorcycle, however, it is intended that a tyre intended to be mounted on a front wheel of a motorcycle has a rolling direction which is opposite to that of a tyre intended to be mounted on a rear wheel of a motorcycle.

In other words, for a tyre according to the invention, mounted on the front wheel of a motorcycle, the rolling direction is opposite to that indicated by arrow F in FIG. 4 and is such that, considering a same first groove 18, 19, the third segment 22 is the first to enter in the footprint area, followed by the second segment 21 and only subsequently by the first segment 20.

The tread band 8 of the tyre according to the present invention depicted in FIGS. 3 and 4, differently from that of a tyre according to the prior art of the same Applicant shown in FIG.

1, has only first grooves 18, 19. In other words, no other grooves are present to define the tread pattern 8.

The aforesaid choice results in a lower frequency of the grooves defining the tread pattern, with advantage to the stiffness of the tread band, particularly desired in a tyre intended for the Supersport segment.

The three segments 20, 21, 22 form a single first groove 18, 19. The so formed first grooves 18, 19 are the only ones present in the module 14.

A tread pattern as in the example shown in FIG. 4 altogether define a void-to-rubber ratio lower than 8%, preferably lower than 6%.

According to an important aspect of the present invention, the tread pattern defines on the tread band a void-to-rubber ratio which increases from the equatorial plane X-X towards the lateral annular portions C, and decreases from the lateral annular portions C towards the shoulder portions B.

The Applicant has in fact found that, for this class of motorcycles, the draining is carried out particularly by a tread band portion with a central location but spaced apart from the equatorial plane, and that in the tyre a greater stiffness is always required in the most central portion astride the equatorial plane and at the shoulders.

To this end, preferably, each shoulder annular portion B has a void-to-rubber ratio equal to zero.

This choice may in fact be particularly advantageous in the rear tyre of vehicle intended for the Supersport segment, since it allows both the area of the contact region between tyre and ground when running on a bend at the maximum camber angle to be significantly increased, and a closed ring to be formed in the tread band, which increases the stiffness thereof, above all against shear stress (i.e. in the plane of the lateral and longitudinal contact forces).

The increase of the area of the region of contact with the ground, and the increase of the shear stiffness, can significantly improve the roadholding of the motorcycle when running on a bend and/or the effective transfer to the ground of the traction torque while accelerating when leaving a bend.

Always to the end of increasing the tyre stiffness, but in a region astride the equatorial plane X-X for allowing the traction torque to be suitably transferred to the ground in straight running, the central annular portion A has a void-to-rubber ratio preferably lower than 2%, preferably substantially equal to zero.

In the embodiment shown in FIG. 4 the first longitudinal grooves 18, 19 have a decreasing depth, diminishing from the equatorial plane X-X towards the shoulders. Preferably, the grooves 18, 19 have a depth smaller than or equal to 8 mm.

According to an embodiment shown in FIG. 3, the first main grooves 18, 19 have a width which decreases along their extension, diminishing moving from the second segment 22 towards their ends, i.e. towards the first and the third 21 segment. Preferably, the first longitudinal grooves 18, 19 have width smaller than or equal to 6 mm.

The Applicant has observed that the aforesaid choices as to the depth and width of the first longitudinal grooves 18, 19 allow the behaviour stability of the tread band to be further improved, even when particularly soft compounds are used.

Referring to the embodiments shown in FIG. 3, it can be noted that the first longitudinal grooves 18, 19 have both ends comprising two first outer edges 30, 31 which are substantially parallel the extension direction of the first longitudinal groove 18, 19 and a transverse outer edge 32 inclined with respect to the extension direction of the groove.

The transverse outer edge 32 in inclined so a to form an acute angle with the extension direction of the first longitudinal grooves 18, 19.

Furthermore, the outer transverse edge 32 is joined to the two first outer edges 30, 31.

The aforesaid choice for the configuration of the ends of the first grooves 18, 19 allow the phenomenon of the so called wear wake of the groove to be reduced.

At the ends of the first longitudinal grooves 18, 19 there is a depth decrease for joining the groove bottom to the outer edges 30, 31 and to the transverse edge 32.

At the ends of the first longitudinal grooves 18, 19 the depth decrease for joining the groove bottom to the outer edges 30, 31 and to the transverse edge 32 is gradual.

The following table 1 shows the results obtained from an exemplary tyre according to the invention with size 180/60 R 17 for use on the rear tyre of a motorcycle (Yamaha R6 Superstock) with a pattern such as that shown in previous FIG. 3. The results in table 1 were assessed with values ranging from 1 to 5 and compared with a comparison tyre, model Diablo Supercorsa™, with the same size and carcass/belt structure, comprising a tread band with a pattern such as that shown in FIG. 1.

The exemplary tyre according to the invention has a curvature ratio equal to 0.309, like the comparison tyre.

Furthermore, for the tread band of the exemplary tyre according to the invention a softer compound was used than that of the tread band of the comparison tyre, with a greater tan δ value and a lower modulus of elasticity at high temperature (70°).

In table 1 the assessments obtained from the tyre according to the invention as compared with the comparison tyre are reported for five parameters: stability during acceleration, stability during braking, grip, mobility under the footprint, contact feeling.

In order to assess such parameters, the test driver simulated on a track some typical manoeuvres. Afterwards, the test driver assessed the tyre behaviour and gave a score depending on the tyre performance during said manoeuvres.

The results of these tests are expressed according to an assessment scale representing the subjective opinion expressed by the test driver by means of a score system. The values reported in the following table represent an average of values obtained in many test sessions (for example, 5-6 tests) and provided by several test drivers. It shall be noted that the scale goes from a minimum value of 1 to a maximum value of 5.

TABLE 1

|  | Comparison tyre | Invention |
|---|---|---|
| Stability during acceleration | 4 | 4.15 |
| Stability during braking | 4 | 4.15 |
| Mobility under the footprint | 4 | 4.15 |
| Grip on track | 4 | 4.15 |
| Contact feeling | 4 | 4.15 |

The tyre according to the invention has a better behaviour as compared to the comparison tyre in all of the evaluated features.

As it can be seen, keeping the other structural features of tyre the same, the contribution given by the tread pattern turns out to be important for the tyre behaviour on track when riding to the limit on a bend, both in maximum braking when entering the bend and in maximum acceleration when leaving the bend. In particular, the contribution given by the tread pattern allows for an effective compensation of a reduction in stability during acceleration when leaving a bend due to the increased softness of the compound.

At the end of the aforesaid tests the tyres were also compared for visually assessing their wear condition. It was found that both the tyres, respectively the tyre according to the invention and the comparison tyre, had an abraded annular portion, usually called "wear strip".

However, the abrasion of the tyre according to the invention was less pronounced and was located in an axially outer portion with respect to the pattern of the tread band.

In other words, the new pattern of the tread band is less affected by the wear strip and thus has a lesser decay of performance on track.

Furthermore, the visual comparison makes evident that the "wear strip" of the tyre according to the invention is more regular, in other words, it has a substantially constant axial width along the circumferential development, as compared to the comparison tyre.

A constant axial width of the wear strip along the circumferential development results in a less variable behaviour of the tyre on track.

The present invention has been described with reference to some embodiments thereof. Many modifications can be made in the embodiments described in detail, still remaining within the scope of protection of the invention, defined by the following claims.

The invention claimed is:

1. A tyre for motorcycles, having a tread band comprising a central annular portion symmetrically located astride an equatorial plane; two lateral annular portions located on axially opposite sides with respect to the central annular portion; and two shoulder annular portions located on axially opposite sides with respect to the lateral annular portions, the central annular portion having an axial extension not greater than 25% of an axial development of the tread band;

each shoulder annular portion having an axial extension not greater than 20% of the axial development of the tread band;

each lateral annular portion having an axial extension not greater than 35% of the axial development of the tread band;

the tread band comprising a plurality of grooves adapted to define a tread pattern, the grooves of the tread pattern altogether defining a void-to-rubber ratio lower than 8% on said tread band;

the tread band comprising a module repeated along a direction of circumferential development of the tyre comprising:

at least two substantially longitudinal grooves oppositely inclined with respect to the equatorial plane of the tyre, wherein:

the first substantially longitudinal grooves mainly extend in the lateral annular portions and comprise, moving axially away from the equatorial plane of the tyre, at least three substantially straight and substantially consecutive segments, wherein a first segment has an inclination with respect to the equatorial plane adapted to form an angle greater than 150°, and wherein the first segment has a length measured along an extension thereof greater than 4% of the circumferential development of the tyre;

a second segment has a length measured along an extension thereof smaller than a length of the first segment;

the second segment extending in a radial region of a lateral annular portion defined by radial angles between +/−5° and +/−25°, in a case of a tyre intended to be mounted on a rear wheel of a motorcycle, and between +/−5° and +/−20°, in a case of a tyre intended to be mounted on a front wheel of a motorcycle.

2. The tyre for motorcycles according to claim 1, wherein a third segment is located consecutively to the said second segment and has an inclination with respect to the equatorial plane adapted to form an angle between 90° and 180°.

3. The tyre for motorcycles according to claim 1, wherein the grooves of the tread pattern altogether define on said tread band a void-to-rubber ratio greater than 4%.

4. The tyre for motorcycles according to claim 1, wherein the first segment, the second segment and a third segment of the first grooves comprise a midline, and an axially outermost point of a midline of the second segment is located at radial angles of +/−25° at most.

5. The tyre for motorcycles according to claim 1, wherein the second segment has an inclination with respect to the equatorial plane adapted to form an angle smaller than 60°.

6. The tyre for motorcycles according to claim 1, wherein the second segment has a length measured along an extension thereof smaller than 40 mm.

7. The tyre for motorcycles according to claim 1, wherein the first segment extends in a radial region of the lateral annular portion defined by radial angles between +/−5° and +/−25°, in the case of a tyre intended to be mounted on the rear wheel of a motorcycle, and between +/−5° and +/−20°, in the case of a tyre intended to be mounted on the front wheel of a motorcycle.

8. The tyre for motorcycles according to claim 1, wherein a third segment extends in a radial region of the lateral annular portion defined by radial angles between +/−5° and +/−50°, in the case of a tyre intended to be mounted on the rear wheel of a motorcycle, and between +/−5° and +/−55°, in the case of a tyre intended to be mounted on the front wheel of a motorcycle.

9. The tyre for motorcycles according to claim 1, wherein a third segment has an extension greater than an extension of the second segment, but smaller than an extension of the first segment.

10. The tyre for motorcycles according to claim 1, wherein, in each module, said two first substantially longitudinal grooves are staggered with respect to each other in a circumferential direction.

11. The tyre for motorcycles according to claim 1, wherein the second segment has an inclination with respect to the equatorial plane adapted to form an angle between 15° and 60°, extremes included.

12. The tyre for motorcycles according to claim 1, wherein the first segment has an inclination with respect to the equatorial plane adapted to form an angle between 150° and 180°, extremes included.

13. The tyre for motorcycles according to claim 1, wherein the tread band comprises only first grooves.

14. The tyre for motorcycles according to claim 1, wherein each shoulder annular portion has a void-to-rubber ratio equal to zero.

15. The tyre for motorcycles according to claim 1, wherein the central annular portion has a void-to-rubber ratio lower than 2%.

16. The tyre for motorcycles according to claim 1, wherein each lateral annular portion has a void-to-rubber ratio greater than 4%.

17. The tyre for motorcycles according to claim 1, wherein said tread pattern defines on said tread band a void-to-rubber ratio which increases from the equatorial plane toward the lateral annular portions and decreases from the lateral annular portions toward the shoulder portions.

18. The tyre for motorcycles according to claim 1, wherein said first substantially longitudinal grooves comprise at least one end having a gradual depth decrease.

19. The tyre for motorcycles according to claim 1, wherein said first grooves comprise an end comprising two first outer edges substantially parallel to an extension direction of the first grooves and a transverse outer edge inclined with respect to an extension direction of the first grooves, said transverse outer edge being joined to two first outer edges.

20. The tyre for motorcycles according to claim 1, wherein said first grooves have an average width smaller than or equal to about 6 mm.

21. The tyre for motorcycles according to claim 1, wherein said first grooves have a depth smaller than or equal to about 8 mm.

* * * * *